(12) United States Patent
Schubert et al.

(10) Patent No.: US 6,203,599 B1
(45) Date of Patent: Mar. 20, 2001

(54) PROCESS FOR THE REMOVAL OF GAS CONTAMINANTS FROM A PRODUCT GAS USING POLYETHYLENE GLYCOLS

(75) Inventors: Craig Norman Schubert, Belle Mead, NJ (US); William I. Echt, Danbury, CT (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/362,359

(22) Filed: Jul. 28, 1999

(51) Int. Cl.$^7$ .............................. B01D 53/14; B01D 19/00
(52) U.S. Cl. ................................ 95/172; 95/176; 95/177; 95/203; 95/204; 95/235; 95/236
(58) Field of Search .............................. 95/235, 236, 172, 95/156, 174, 176, 177, 187, 192, 203, 204, 208

(56) References Cited

U.S. PATENT DOCUMENTS

| | | |
|---|---|---|
| 3,347,621 * | 10/1967 | Papadopoulos et al. ............... 95/235 |
| 3,362,133 | 1/1968 | Kutsher et al. . |
| 3,463,603 * | 8/1969 | Freitas et al. ............................. 95/235 |
| 3,533,732 | 10/1970 | Moore et al. . |
| 3,737,392 * | 6/1973 | Ameen et al. . |
| 3,837,143 | 9/1974 | Sutherland et al. ...................... 55/32 |
| 4,242,108 | 12/1980 | Nicholas et al. ........................... 55/40 |

(List continued on next page.)

FOREIGN PATENT DOCUMENTS

| | | |
|---|---|---|
| 2035123 | 6/1980 | (GB) . |
| 2167397 | 5/1986 | (GB) . |

OTHER PUBLICATIONS

"Proceedings of the Gas Conditioning Conference", School of Petroleum and Geological Engineering and the Business and Industrial Services Department Extension Division (The University of Oklahoma) 1966, pp F1–F3.

"Helpful Hints for Physical Solvent Absorption", W. Wolfer et al., *Hydrocarbon Processing*, 1982, pp 4/8, 7/8.

"Partial Molar Volumes of Acidic Gases in Physical Solvents and Prediction of Solubilities at High Pressures", Xu, Yuming et al., Department of Chemistry and Department of Chemical Engineering, (University of Alabama) 1991, pp 55–57.

"Solubilities of Carbon Dioxide, Hydrogen Sulfide and Sulfur Dioxide in Physical Solvents", Xu, Yuming et al., *The Canadian Journal of Chemical Engineering*, 1992, pp 569–573.

"Bulk Removal of Carbon Dioxide with Selexol® Solvent at Pikes Peak Plant", Raney, Donald R., *1977 Gas Conditioning Conference*, pp 1–9.

(List continued on next page.)

*Primary Examiner*—Duane Smith
*Assistant Examiner*—Jason M. Greene
(74) *Attorney, Agent, or Firm*—J. Kentoffio

(57) ABSTRACT

The present invention provides a process for removing gas contaminants such as hydrogen sulfide and carbon dioxide from a product gas such as natural gas or synthesis gas. According to the invention the product gas is contacted with a solvent which includes dialkyl ethers of polyethylene glycols and water, and a high pressure recycle loop is utilized to desorb a portion the gas contaminants and co-absorbed product gas from the solvent. The solvent is provided with an amount of water sufficient to increase recovery of co-absorbed product gas while at the same time providing a reduced circulation rate requirement for the solvent and reduced re-compression and cooling requirements for the recycle gas.

7 Claims, 1 Drawing Sheet

U.S. PATENT DOCUMENTS

| | | | | |
|---|---|---|---|---|
| 4,302,220 | | 11/1981 | Volkamer et al. | 55/32 |
| 4,414,004 | * | 11/1983 | Wagner et al. | 95/235 |
| 4,421,535 | | 12/1983 | Mehra | 62/17 |
| 4,545,965 | | 10/1985 | Gazzi et al. | 423/229 |
| 4,581,154 | | 4/1986 | Kutsher et al. | 252/170 |
| 4,702,750 | * | 10/1987 | Becker | 95/235 |
| 4,962,238 | | 10/1990 | Wolfe et al. | 568/621 |
| 4,999,031 | | 3/1991 | Gerhardt et al. | 55/43 |
| 5,346,537 | * | 9/1994 | Lowell | 95/177 |

OTHER PUBLICATIONS

"Selexol® Solvent Process for Combined Gas Treating and Hydrocarbon Recovery", Shah, Vinod A. et al., *Energy Processing/Canada*, 1987, pp 8–10.

"Physical Solvent Stars in Gas Treatment/Purification", Swent, John W. et al., *Chemical Engineering*, 1970, pp 54–56.

* cited by examiner

PROCESS FOR THE REMOVAL OF GAS CONTAMINANTS FROM A PRODUCT GAS USING POLYETHYLENE GLYCOLS

BACKGROUND OF THE INVENTION

The present invention provides a process for removing gas contaminants, such as hydrogen sulfide and carbon dioxide, from gas mixtures which include these contaminants. More particularly, the invention provides a process which utilizes a solvent comprising dialkyl ethers of polyethylene glycols and water to remove gas contaminants from product gas streams, such as natural, synthesis or other product gas streams.

It is known in the art to use solvents comprising mixtures of dialkyl ethers of polyalkylene glycols to remove gas contaminants from valuable product gases. These contaminants are removed by contacting the contaminated product gas with fresh solvent in an absorber or other specialized equipment operated under conditions of high pressure and/or low temperature which are favorable for absorption. Once the contaminants are removed, the decontaminated gas is ready for sale or for additional downstream conditioning, depending on the product stream specifications. The solvent is regenerated for reuse by driving off the absorbed contaminants under low pressure and/or high temperature conditions favorable for desorption. Flash tanks and/or stripper columns are typically used to effect this separation.

The use of dialkyl ethers of polyethylene glycols to remove gas contaminants commonly results in the co-absorption of valuable product gas, methane for example. The co-absorbed gases generally emerge from the solvent during regeneration and generally have little or no value because of the high concentration of undesirable contaminants. The loss of valuable co-absorbed gas is typically reduced by adding a high pressure recycle loop to the system design. The high pressure recycle loop allows partial regeneration of the rich solvent, and the gases liberated in the recycle loop, a mixture of valuable product gas and undesirable gas contaminants, are re-compressed, cooled and recycled back to the absorber where the liberated product gas is recovered. As is well understood in the art, the term "high pressure" is used to characterize the loop because the flash tank included within the loop operates at a pressure below the absorber pressure but above the pressure at which the solvent is finally regenerated.

While a high pressure recycle loop increases product gas revenue, capital and operating expenses for systems including a recycle loop are also increased. The high pressure flash tank, compression equipment and heat exchangers required for the recycle loop all have associated costs. In addition, increased gas flow through the absorber often increases the absorber circulation requirement, which necessitates larger high pressure pumps, heat exchangers, piping and other components throughout the entire system.

Economic optimization between increased product gas recovery and increased capital and operating costs is commonly attempted by adjusting the recycle flash tank pressure. High flash tank pressures result in low recycle gas volumes, low product gas recovery and low additional costs. Low flash tank pressures result in high recycle gas volumes, high product gas recovery and high additional costs. However, properly balancing these parameters has proven to be quite difficult, and adjusting the flash tank pressure has generally not provided an effective means of offsetting the increased capital and operating expenditures associated with systems which include a high pressure recycle loop and the need to maximize product gas recovery.

SUMMARY OF THE INVENTION

The present invention provides a process for removing gas contaminants from a product gas using a solvent comprising dialkyl ethers of polyethylene glycol and water. The process includes a high pressure recycle loop to reduce the loss of co-absorbed product gas. However, because the solvent also comprises sufficient water, the capital and operating costs typically associated with a high pressure recycle loop are significantly reduced.

The process is particularly useful for removing gas contaminants such as hydrogen sulfide and carbon dioxide from product gases such as natural gas and synthesis gas. It should be understood, however, that the invention is in no way limited in this regard and that the process may be used to remove diverse sulfur compounds, carbonyl sulfide and other gas contaminants from a variety of commercially valuable product gases.

According to the invention, a product gas containing gas contaminants is contacted with the solvent in at least one absorption stage. A specified amount of the gas contaminants are removed from the product gas by the solvent, and decontaminated product gas is discharged from the absorption stage. The solvent, which contains dissolved gas contaminants and co-absorbed product gas, is then partially regenerated in a high pressure recycle loop, where a portion of the dissolved contaminants and co-absorbed product gas is released from the solvent as a recycle gas. The recycle gas is re-compressed, cooled and then returned to the absorption stage. Regeneration of the solvent is completed by removing a residual portion of the dissolved acid gas contaminants and co-absorbed product gas remaining in the solvent. The co-absorbed product gas and gas contaminants removed from the solvent in this regeneration stage are released as a discharge gas. The fully regenerated solvent is then returned to the absorption stage.

The solvent is provided with a sufficient amount of water to increase recovery of co-absorbed product gas, while at the same time providing a reduced circulation rate requirement for the solvent and reduced re-compression and cooling requirements for the recycle gas. Accordingly, the use of the solvent provides a reduction in the capital and operating costs typically associated with processes which utilize a high pressure recycle loop, most significantly the costs associated with re-compression and cooling requirements for the recycle gas, while simultaneously providing increased recovery of product gas.

In the preferred embodiment of the invention, the solvent comprises a mixture of dimethyl ethers of polyethylene glycols and sufficient water to provide the solvent with from about 2 wt % to about 10 wt % water on a gas free basis. Most preferably, the solvent includes from about 5 wt % to about 8 wt % water on a gas free basis.

DETAILED DESCRIPTION OF THE INVENTION

Figure 1:
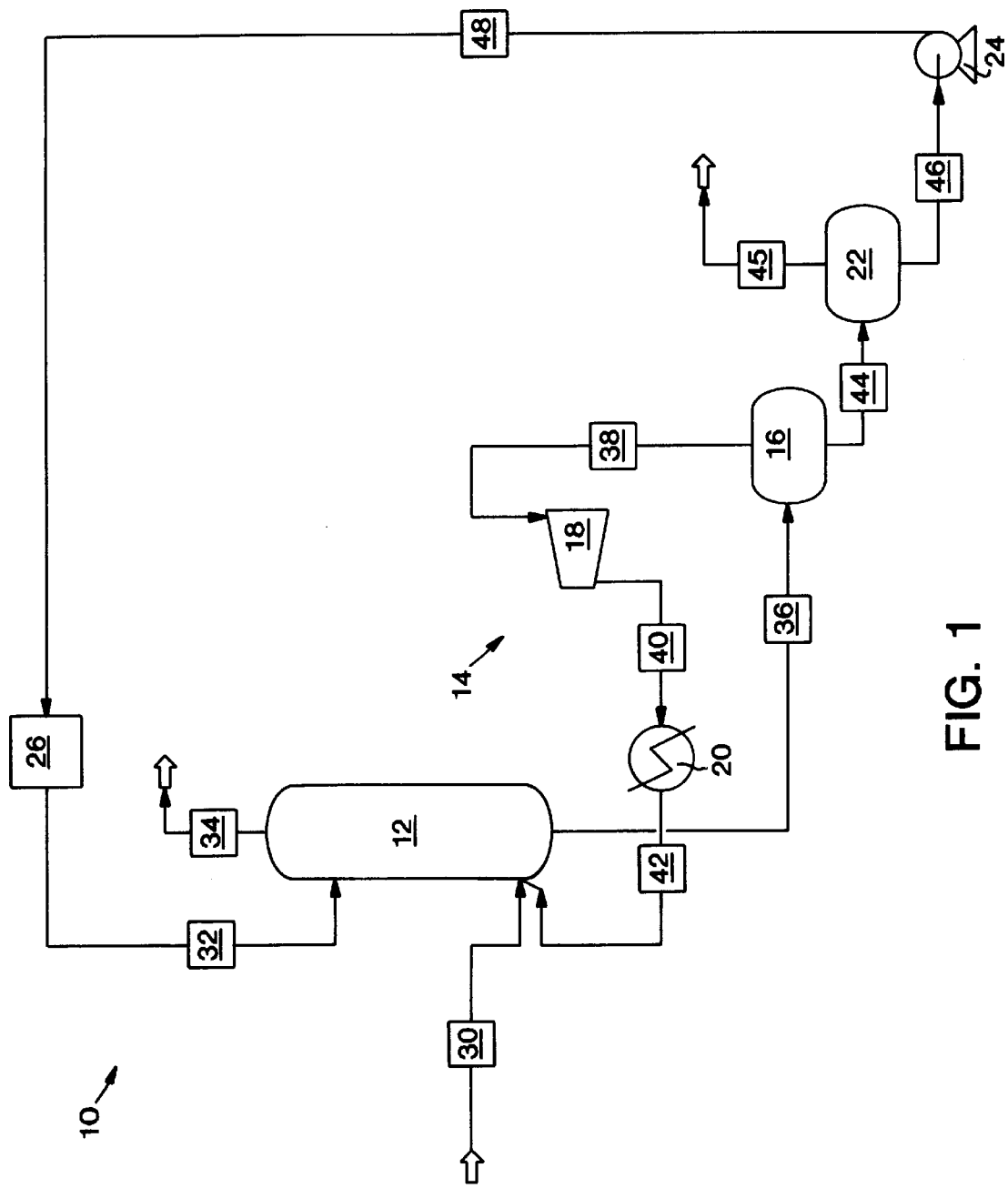
FIG. 1 is a schematic illustration of a system which operates according to the process taught by the invention.

FIG. 1 illustrates a system for removing gas contaminants from a product gas which operates according to the process taught by the invention. Accordingly, the invention will be described in connection with a description of the system illustrated in FIG. 1.

As shown in FIG. 1, the system, generally designated 10, comprises an absorber 12, and a recycle loop, generally designated 14 which includes a high pressure flash tank 16, a recycle compressor 18 and a recycle cooler 20. The system further includes a low pressure flash tank 22, a circulation pump 24, and a distillation unit 26.

A product gas containing gas contaminants, for example natural gas contaminated with hydrogen sulfide and carbon dioxide, enters the bottom of the absorber 12 through line 30 and is brought into intimate contact with a regenerated liquid solvent which enters near the top of the absorber through line 32. The absorber is a conventional absorber tower of a type well-known to those skilled in the art, and the regenerated solvent which contacts the product gas in the absorber comprises a mixture of dialkyl ethers of polyethylene glycols and water.

A number of such solvents are well-known to those skilled in the art. Generally, these solvents comprise one or more dialkyl ethers of polyethylene glycols that are normally liquid and remain so under the conditions under which contaminated product gas is processed. Typically, the solvent comprises a mixture of dimethyl or diethyl ethers of polyethylene glycols, with a mixture of dimethyl ethers of polyethylene glycols having the following general formula being preferred:

$$CH_3O(CH_2H_4O)_xCH_3$$

wherein x is between 3 and 9. The most preferred solvent for use in the invention comprises a mixture of such dimethyl ethers of polyethylene glycols available from Union Carbide Corporation, Danbury, Conn. and sold under the registered trademark "SELEXOL".

A specified amount of the gas contaminants contained in the product gas are removed by the solvent in the absorber 12, and decontaminated product gas, i.e., product gas having the specified amount of contaminants removed, is discharged from the top of the absorber through line 34. Typically, substantially all of the gas contaminants are removed from the product gas in the absorber 12; however, as is well-known to those skilled in the art, this is not always the case, and the amount of contaminants removed depends on the particular use to which the decontaminated product gas stream will be put.

Rich solvent, which now contains dissolved contaminants and co-absorbed product gas, emerges from the bottom of the absorber 12 and passes through line 36 to the recycle loop 14 where the solvent is partially regenerated. The rich solvent passes directly to the high pressure flash tank 16, where a portion of the dissolved gas contaminants and the co-absorbed product gas desorb from the solvent and emerge from the flash tank 16 as a recycle gas. The recycle gas passes through line 38 to the recycle compressor 18 which includes one or more compressor units where the recycle gas is re-compressed. The gas then moves through line 40 to the recycle cooler 20 which includes one or more heat exchangers where the recycle gas is cooled before being returned to the absorber 12 via line 42. As noted above, the loop 14 is designated as a "high pressure recycle loop" because the flash tank 16 operates at a pressure below the operating pressure of the absorber but above the regeneration pressure in the flash tank 22.

The solvent, now containing only a residual portion of dissolved gas contaminants and co-absorbed product gas, emerges from the high pressure flash tank and passes through line 44 to the low pressure flash tank 22. Most of the remaining dissolved contaminants and co-absorbed product gas desorb from the solvent in flash tank 22 and are released from the flash tank through line 45 as a discharge gas. It should be understood that the regeneration of the solvent is not limited to the use of the illustrated low pressure flash tank. Solvent regeneration can occur in one or more stages using a plurality of flash tanks and/or stripper units or other suitable equipment, in a manner which is well-known in the art.

The fully regenerated solvent emerges from the low pressure flash tank 22 and moves through line 46 to recycle pump 24. The recycle pump delivers the regenerated solvent to distillation unit 26 to maintain the water content of the solvent at a specified level. As those skilled in the art will recognize, product gas streams occasionally include undesirable amounts of water. Accordingly, to maintain the water content of the solvent at a specified concentration, any additional water absorbed by the solvent from the product gas can be removed in distillation unit 26. Once the regenerated solvent leaves the distillation unit, it passes through line 32 back to the absorber 12.

Those skilled in the art will recognize that it is necessary to maintain thermal balance within the system shown in FIG. 1. For example, a heat exchanger may be required between the pump 24 and the distillation unit 26 to adjust the temperature of the solvent prior to returning the solvent to the absorber 12. Typically, the solvent entering the absorber is at a temperature of from about 10° F. to about 120° F., and preferably from about 10° F. to about 40° F. Accordingly, heat exchange capacity can be added as required to insure that the solvent is at an appropriate temperature prior to being returned to the absorber and/or to otherwise maintain thermal balance within the system.

As noted above, sufficient water is added to the solvent to simultaneously obtain increased product gas recovery and decreased capital and operating expenses. More specifically, adjusting the water concentration of the solvent permits the high pressure flash tank 16 to be operated at a pressure which increases product gas recovery, while at the same time reduces the re-compression requirement at recycle compressor 18 and, accordingly, reduces the cooling requirement at recycle cooler 20. Moreover, the overall circulation requirement for the solvent is also reduced. All of these results are unexpected, particularly the reduction in the solvent circulation requirement, since increasing the concentration of water in the solvent should decrease the solubility of carbon dioxide in the solvent and therefore increase the solvent circulation requirement. The advantages provided by the invention will be described more fully by the following Examples.

EXAMPLE I

Approximately 500 MMSCFD (million standard cubic feet/day) of natural gas containing 45 mole % carbon dioxide, 50 mole % methane, 1 mole % water and 4 mole % C2+ hydrocarbons at 1210 psia enter an absorber tower where the gas is contacted with a regenerated solvent comprising a mixture of dimethyl ethers of polyethylene glycols and about 4.8 wt % water on a gas free basis. The particular solvent which is used in this Example is "SELEXOL" solvent including about 4.8 wt % water on a gas free basis. The absorber is a conventional tower which provides approximately six equilibrium stages of gas-liquid contact. The contaminated natural gas enters near the bottom of the tower and the regenerated solvent enters near the top, and the gas and solvent are brought into counter-current contact within the absorber. Under these conditions, approximately 13,800 gpm of solvent circulation are required to reduce the carbon dioxide content of the natural gas from 45 mole % to less than 3 mole %.

Following contact with the contaminated natural gas, rich solvent containing dissolved contaminants and co-absorbed methane emerges from the bottom of the absorber and is passed directly to a high pressure recycle loop. The rich solvent enters a high pressure flash tank which is operated at 304 psia. Under these conditions, the most volatile components, principally carbon dioxide and methane, desorb from the solvent and emerge from the flash tank as a recycle gas. The recycle gas discharged from the high pressure flash tank is passed to a recycle compressor including one or more compressors requiring about 17,000 HP. The total gas flow rate from the flash tank to the recycle compressor (line 38 in FIG. 1) is approximately 36% of the flow rate of contaminated natural gas entering the absorber (line 30 in FIG. 1). The re-compressed gas is then cooled in a recycle cooler comprising one or more heat exchangers capable of providing a cooling duty of about 56 MMBTU/hr (million BTU/hour). The re-compressed and cooled recycle gas is then returned to the absorber. Accordingly, the solvent is partially regenerated in the high pressure flash tank and valuable co-absorbed methane is recovered in the recycle loop.

The partially regenerated solvent passes to a low pressure flash tank operated at about 18 psia where the remaining dissolved contaminants and co-absorbed methane desorb from the solvent and are released from the low pressure flash tank as a discharge gas. The now fully regenerated solvent is pumped back to the absorption tower for contact with the contaminated natural gas.

Processing contaminated natural gas in the above-described manner with "SELEXOL" solvent comprising about 4.8 wt % water on a gas free basis limits total methane losses to about 1.7 mole % of the incoming natural gas.

EXAMPLE II

Approximately 500 MMSCFD of natural gas containing 45 mole % carbon dioxide, 50 mole % methane, 1 mole % water and 4 mole % C2+ hydrocarbons at 1210 psia is processed in the same manner set forth in Example I with the following differences in process parameters:

The solvent comprises "SELEXOL" solvent and about 7.8 wt % water on a gas free basis;

The total gas flow rate from the high pressure flash tank to the recycle compressor is approximately 25% of the flow rate of the incoming contaminated natural gas;

The re-compression requirement at the recycle compressor is 10,000 HP;

The cooling requirement at the recycle cooler is 35 MMBTU/hr;

The solvent circulation requirement is 12,500 gpm; and

The total methane loss is limited to about 1.3 mole % of the incoming natural gas.

EXAMPLE III (prior art)

Approximately 500 MMSCFD of natural gas containing 45 mole % carbon dioxide, 50 mole % methane, 1 mole % water and 4 mole % C2+ hydrocarbons at 1210 psia is processed in the same manner set forth above in Example I with the following differences in process parameters:

The solvent comprises "SELEXOL" solvent and about 0.9 wt % water on a gas free basis. This is a typical solvent water concentration used in prior art systems which include a high pressure recycle loop;

The total gas flow rate from the high pressure flash tank to the recycle compressor is approximately 53% of the flow rate of the incoming contaminated natural gas;

The re-compression requirement at the recycle compressor is 23,000 HP;

The cooling requirement at the recycle cooler is 75 MMBTU/hr;

The solvent circulation requirement is 16,000 gpm; and

The total methane loss is limited to about 3 mole % of the incoming natural gas.

The advantages provided by the present invention as compared with the prior art are summarized below in Table I.

TABLE I

|  | 0.9 wt % Water | 4.8 wt % Water | 7.8 wt % Water |
| --- | --- | --- | --- |
| Circulation required (gpm) | 16,000 | 13,800 | 12,500 |
| Re-compression (HP) | 23,000 | 17,000 | 10,000 |
| Recycle gas cooling (MMBTU/hr) | 75 | 56 | 35 |
| Methane loss (mole % of feed) | 3 | 1.7 | 1.5 |

As illustrated by the Examples set forth above and as summarized in Table I, methane loss is limited to about 3 mole % in a prior art gas purification process employing a solvent comprising about 1 wt. % water and a high pressure flash tank operating at 304 psia. However, approximately 23,000 HP will be required to re-compress the recycle gas from 304 psia to the absorber pressure. Furthermore, since compression equipment generally increases the temperature of a gas, heat exchangers capable of providing a cooling duty of approximately 75 MMBTU/hr will be required. Finally, due to the increased volume of gas processed by the absorption equipment, required solvent circulation will be 16,000 gpm. Accordingly, the increased revenue associated with the reduced methane loss provided by the recycle loop is offset, in part or in total, by increased capital and operating costs associated with the recycle loop equipment.

Increasing the water content of the solvent as taught by the process of the present invention, not only will increase product gas recovery, but also will significantly reduce the capital and operating cost associated with such a system. As the Examples demonstrate and as summarized in Table I, if the water content of the regenerated solvent increases from about 1 wt % to about 5 wt % (gas free basis) and if the high pressure flash tank remains at 304 psia, the re-compression requirement will be reduced from 23,000 HP to 17,000 HP and the recycle gas cooling duty requirement will decrease from 75 MMBTU/hr to 56 MMBTU/hr. In addition, the overall circulation requirement will be reduced from 16,000 gpm to 13,800 gpm and the methane loss will decrease from 3 mole % to 1.7 mole %. If the solvent water concentration is increased still further to about 8 wt % (gas free basis) and if the high pressure flash tank remains at 304 psia, the re-compression requirement will be reduced even further to 10,000 HP and the recycle gas cooling duty requirement will decrease from 75 MMBTU/hr to 35 MMBTU/hr. The overall circulation requirement will be reduced from 16,000 gpm to 12,500 gpm and the methane loss will decrease from 3 mole % to 1.3 mole %.

Accordingly, the present invention allows those skilled in the art to achieve an economic optimum between the increased product gas recovery provided by a high pressure recycle loop and the higher capital and operating costs associated with the use of such a system. By utilizing the process taught by the invention and providing the solvent with an appropriate amount of water, increased product gas recovery as well as reduced re-compression, recycle cooling and solvent circulation requirements can be achieved simultaneously.

The data presented in Table I represents only one of the options provided by the invention for achieving an optimum balance between increased product gas recovery and reduced capital and operating costs. Those skilled in the art will recognize that the invention can be utilized in a variety of other ways to strike an appropriate balance between increased product gas recovery and reduced costs as required for each particular gas decontamination application. For example, an even more pronounced reduction in recycle compression and cooling costs can be achieved if an increase in product gas loss can be tolerated. The reverse is also true in that product gas loses can be reduced below the values reported in Table I if an increase in the recycle compression and cooling costs is found to be acceptable. Accordingly, it should be understood that the present invention is in no way limited to the particular disclosed examples wherein the water concentration of the solvent is increased while the high pressure flash tank pressure is kept constant and that the invention provides a variety of other options for adjusting the process parameters to achieve increased product gas recovery and reduced costs.

What is claimed is:

1. A process for removing gas contaminants from a product gas containing such contaminants, said process comprising the steps of:
   (a) contacting the product gas with a solvent comprising a mixture of dialkyl ethers of polyethylene glycols in at least one absorption stage to remove a specified portion of the gas contaminants from the product gas;
   (b) discharging the product gas having the specified portion of the gas contaminants removed therefrom from the absorption stage;
   (c) passing the solvent containing dissolved gas contaminants and co-absorbed product gas to a high pressure recycle loop to partially regenerate the solvent by releasing a portion of the dissolved gas contaminants and the co-absorbed product gas from the solvent as a recycle gas;
   (d) re-compressing and cooling the recycle gas and then returning the recycle gas to the absorption stage;
   (e) completing regeneration of the solvent by removing from the solvent a residual portion of the gas contaminants and the co-absorbed product gas remaining therein and releasing the residual portion as a discharge gas;
   (f) returning the completely regenerated solvent to the absorption stage; and
   (g) providing the solvent with an amount of water sufficient to increase recovery of co-absorbed product gas while at the same time providing a reduced circulation rate requirement for the solvent and reduced re-compression and cooling requirements for the recycle gas.

2. The process of claim 1, wherein the mixture of dialkyl ethers of polyethylene glycols comprises a mixture of dimethyl ethers of polyethylene glycols.

3. The process of claim 1, wherein the product gas is one of natural gas and synthesis gas.

4. The process of claim 1, wherein the solvent comprises from about 2 wt % to about 10 wt % water on a gas free basis.

5. The process of claim 1, wherein the solvent comprises from about 5 wt % to about 8 wt % water on a gas free basis.

6. The process of claim 1, wherein the gas contaminants comprise hydrogen sulfide and carbon dioxide.

7. The process of claim 1, wherein after step (e) but before step (f) the process further includes the step of:
   removing a selected amount of water from the solvent.

* * * * *